United States Patent
Hosokoshiyama et al.

(10) Patent No.: US 12,420,985 B2
(45) Date of Patent: Sep. 23, 2025

(54) METHOD OF INJECTION MOLDING PREFORM

(71) Applicant: YOSHINO KOGYOSHO CO., LTD., Tokyo (JP)

(72) Inventors: Hiroshi Hosokoshiyama, Tokyo (JP); Junichi Chiba, Tokyo (JP); Seiji Iso, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 269 days.

(21) Appl. No.: 18/174,945

(22) Filed: Feb. 27, 2023

(65) Prior Publication Data

US 2023/0211925 A1    Jul. 6, 2023

Related U.S. Application Data

(62) Division of application No. 14/900,700, filed as application No. PCT/JP2014/064566 on May 27, 2014, now abandoned.

(30) Foreign Application Priority Data

Jun. 28, 2013  (JP) ................................. 2013-136737

(51) Int. Cl.
   *B29C 45/16*    (2006.01)
   *B29B 11/08*    (2006.01)
   (Continued)

(52) U.S. Cl.
   CPC .............. *B65D 25/54* (2013.01); *B29B 11/08* (2013.01); *B29C 45/0046* (2013.01);
   (Continued)

(58) Field of Classification Search
   CPC ........ B65D 25/54; B65D 1/02; B65D 1/0215; B29C 45/16; B29C 45/00; B29C 45/2806;
   (Continued)

(56) References Cited

U.S. PATENT DOCUMENTS

| | | |
|---|---|---|
| 4,535,901 A | 8/1985 | Okudaira et al. |
| 5,927,525 A | 7/1999 | Darr et al. |
| (Continued) | | |

FOREIGN PATENT DOCUMENTS

| | | |
|---|---|---|
| CN | 101801641 A | 8/2010 |
| DE | 19635334 A1 | 3/1998 |
| (Continued) | | |

OTHER PUBLICATIONS

JPS6075009 English translation prepared Jan. 6, 2025 (Year: 2025).*

(Continued)

*Primary Examiner* — Alison L Hindenlang
*Assistant Examiner* — Shibin Liang
(74) *Attorney, Agent, or Firm* — Oliff PLC

(57) ABSTRACT

A method of injection molding a test tube-shaped preform for biaxial stretch blow molding includes supplying a major material resin from outer and inner flow paths to a combined flow path for a predetermined time and rate. For a period of time within a range of the predetermined time period during which the major material resin is supplied, the intermediate layer resin is simultaneously supplied from the middle flow path to the combined flow path at a second predetermined supplying rate. A columnar laminated molten resin is injected into a cavity of a metal mold connected to a tip of the nozzle through a gate to fill the cavity, the columnar laminated molten resin being composed of the major material resin and the intermediate layer resin formed in the major material resin in a laminated manner that are combined into a columnar shape at the combined flow path.

2 Claims, 13 Drawing Sheets

(51) Int. Cl.
    *B29C 45/00*     (2006.01)
    *B32B 1/00*     (2006.01)
    *B65D 1/02*     (2006.01)
    *B65D 25/54*     (2006.01)
    *B29C 45/28*     (2006.01)
    *B29K 67/00*     (2006.01)
    *B29K 105/00*     (2006.01)
    *B29L 31/00*     (2006.01)

(52) U.S. Cl.
CPC ........ *B29C 45/1607* (2013.01); *B29C 45/164* (2013.01); *B29C 45/1646* (2013.01); *B32B 1/00* (2013.01); *B65D 1/0215* (2013.01); *B29C 2045/1614* (2013.01); *B29C 45/2806* (2013.01); *B29C 2949/3009* (2022.05); *B29C 2949/3014* (2022.05); *B29C 2949/3018* (2022.05); *B29C 2949/3022* (2022.05); *B29C 2949/3034* (2022.05); *B29K 2067/003* (2013.01); *B29K 2105/253* (2013.01); *B29K 2105/258* (2013.01); *B29K 2995/0018* (2013.01); *B29K 2995/0026* (2013.01); *B29L 2031/7158* (2013.01); *B32B 2439/60* (2013.01); *B65D 2203/04* (2013.01)

(58) Field of Classification Search
CPC . B29C 45/0046; B29C 45/1646; B29C 49/22; B29B 11/08; B32B 1/02; B29D 22/00
See application file for complete search history.

(56) References Cited

U.S. PATENT DOCUMENTS

| | | | |
|---|---|---|---|
| 6,419,874 B2 | 7/2002 | Rashid et al. | |
| 6,596,213 B2* | 7/2003 | Swenson | B29C 45/1643 264/328.8 |
| 8,017,063 B2 | 9/2011 | Hutchinson et al. | |
| 8,607,999 B2 | 12/2013 | Toyoda et al. | |
| 9,610,724 B2* | 4/2017 | Hosokoshiyama | B29C 49/22 |
| 9,956,707 B2* | 5/2018 | Chiba | B29C 45/1603 |
| 2009/0230074 A1 | 9/2009 | Toyoda | |
| 2011/0108505 A1 | 5/2011 | Toyoda et al. | |

FOREIGN PATENT DOCUMENTS

| | | | | |
|---|---|---|---|---|
| JP | S60-75009 U | | 5/1985 | |
| JP | S6075009 | * | 5/1985 | ............. B29C 49/08 |
| JP | 2005-153901 A | | 6/2005 | |
| JP | 2010-012605 A | | 1/2010 | |
| JP | 2013-095035 A | | 5/2013 | |
| WO | 2013/065501 A1 | | 5/2013 | |
| WO | 2013/073405 A1 | | 5/2013 | |
| WO | 2013065501 | * | 5/2013 | ............. B29C 45/16 |
| WO | 2013073405 | * | 5/2013 | ............. B29C 45/16 |

OTHER PUBLICATIONS

Jul. 11, 2023 Office Action issued in Chinese Patent Application No. 201910093236.7.
Sep. 25, 2023 Office Action issued in Chinese Application No. 201910093236.7.
Nov. 30, 2023 Office Action issued in Chinese Application No. 201910093236.7.
Sep. 2, 2014 International Search Report issued in International Patent Application No. PCT/JP2014/064566.
Aug. 5, 2016 Office Action issued in Taiwanese Patent Application No. 103122111.
Aug. 12, 2016 Office Action issued in Australian Patent Application No. 2014300155.
Aug. 17, 2016 Office Action issued in Japanese Patent Application No. 2013-136737.
Aug. 22, 2016 Office Action issued in Chinese Patent Application No. 201480034682.6.
Jan. 22, 2017 Office Action issued in Chinese Patent Application No. 201480034682.6.
Feb. 1, 2017 Search Report issued in European Patent Application No. 14816747.1.
Mar. 3, 2017 Office Action issued in Taiwanese Patent Application No. 103122111.
Feb. 3, 2017 Office Action issued in Canadian Patent Application No. 2,916,046.
Dec. 29, 2015 IPRP issued in International Patent Application No. PCT/JP2014/064566.
Jun. 19, 2017 Office Action issued in Chinese Patent Application No. 201480034682.6.
Jul. 20, 2017 Office Action issued in Korean Patent Application No. 10-2015-7035531.
Nov. 14, 2017 Office Action issued in Canadian Application No. 2,916,046.
Oct. 16, 2017 Office Action issued in Taiwanese Application No. 105142559.
Mar. 5, 2018 Office Action issued in European Application No. 14 816 747.1.
Apr. 24, 2018 Office Action issued in Taiwanese Patent Application No. 105142559.
May 23, 2018 Office Action issued in Chinese Patent Application No. 201480034682.6.
Jun. 18, 2018 Office Action issued in Australian Patent Application No. 2017203133.
Jul. 19, 2018 Office Action issued in Chinese Patent Application No. 201611176594.7.
Jul. 31, 2018 Office Action issued in Australian Patent Application No. 2017200637.
Sep. 11, 2018 Office Action issued in European Patent Application No. 14816747.1.
Feb. 26, 2019 Office Action issued in Chinese Patent Application No. 201611176594.7.
Jan. 23, 2019 Office Action issued in Korean Patent Application No. 10-2015-7035531.
Jan. 28, 2019 Office Action issued in Taiwanese Patent Application No. 105142559.
Apr. 15, 2019 Office Action issued in European Patent Application No. 14816747.1.
Aug. 22, 2019 Office Action issued in U.S. Appl. No. 15/707,224.
Jul. 15, 2019 Office Action issued in Chinese Patent Application No. 201611176594.7.
Feb. 20, 2020 Office Action Issued in U.S. Appl. No. 15/707,224.
Jul. 24, 2020 Office Action issued in U.S. Appl. No. 15/707,224.
Jun. 25, 2020 Advisory Action issued in U.S. Appl. No. 15/707,224.
Aug. 5, 2020 Office Action issued in Chinese Patent Application No. 201910093236.7.
Jan. 7, 2021 Office Action issued in U.S. Appl. No. 15/707,224.
Dec. 28, 2020 Office Action issued in Chinese Patent Application No. 201910093236.7.
Mar. 22, 2021 Office Action issued in Chinese Patent Application No. 201910093236.7.
Jul. 12, 2021 Office Action issued in U.S. Appl. No. 15/707,224.
Jun. 22, 2021 Decision of Rejection issued in Chinese Patent Application No. 201910093236.7.
Jun. 30, 2021 Notification of Reexamination issued in Chinese Patent Application No. 201611176594.7.
Oct. 28, 2021 Advisory Action issued in U.S. Appl. No. 15/707,224.
Nov. 30, 2021 Notice of Reexamination Decision issued in Chinese Patent Application No. 201611176594.7.
Jan. 23, 2017 Office Action issued in Korean Patent Application No. 10-2015-7035531.

* cited by examiner

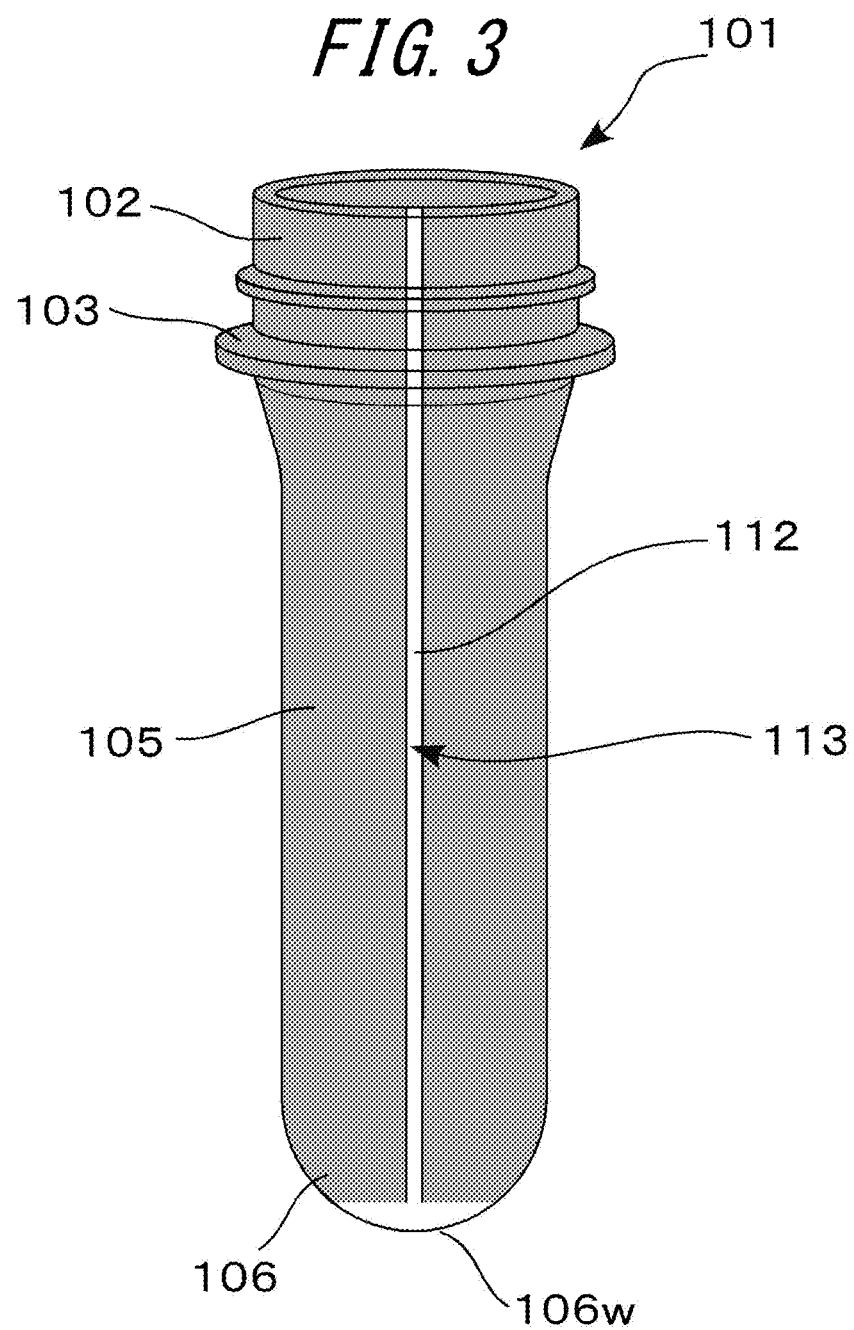

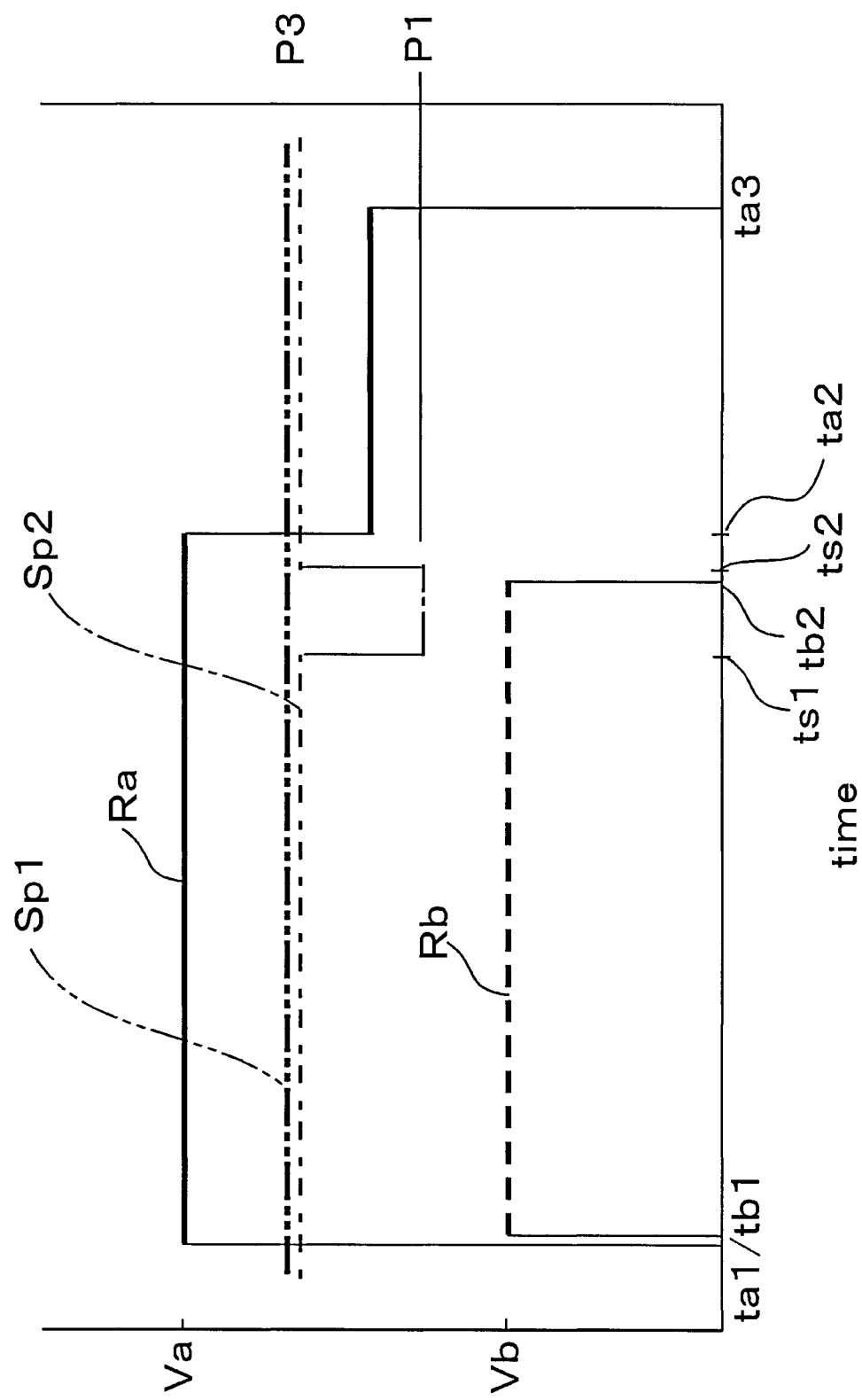

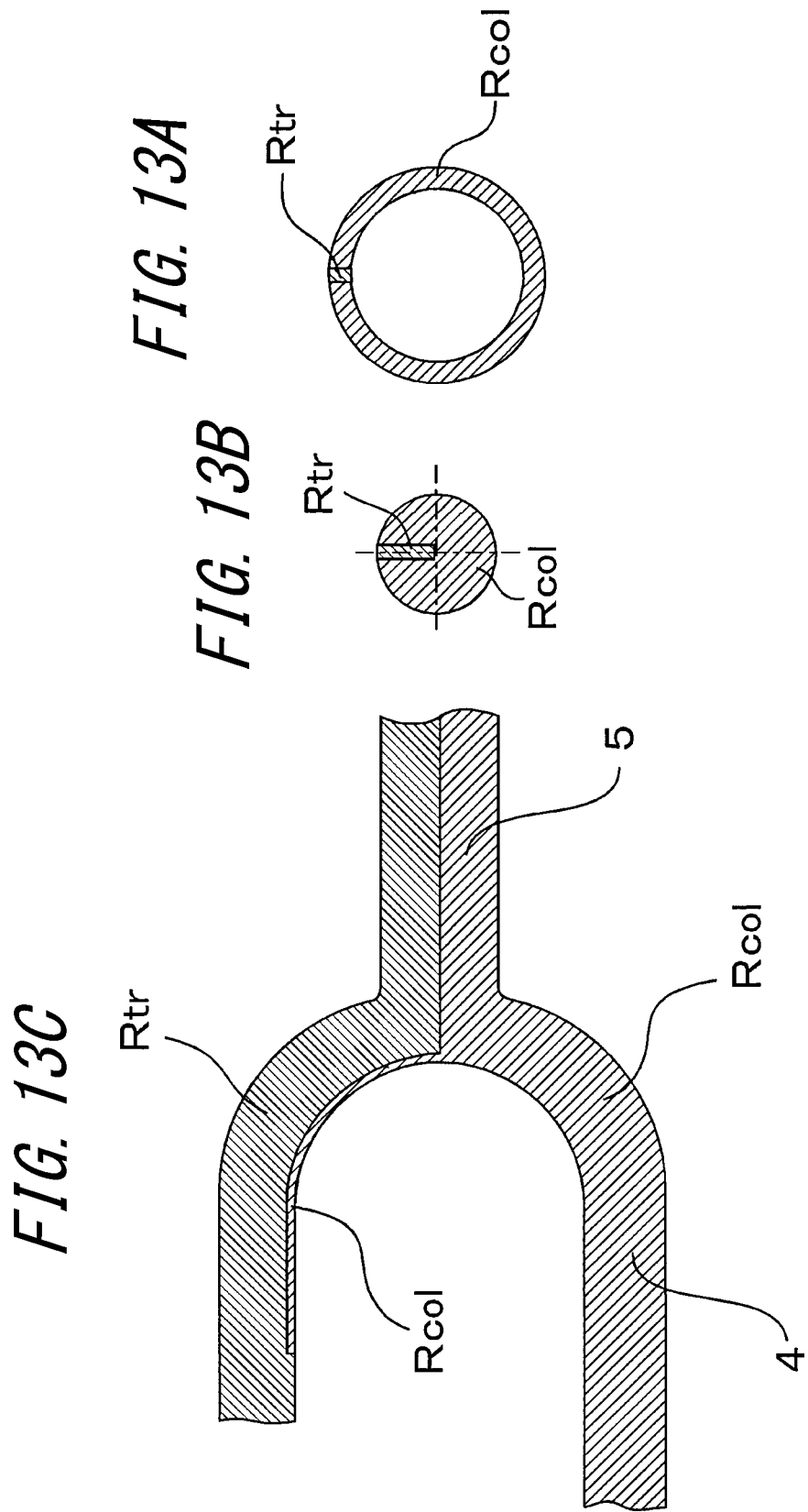

METHOD OF INJECTION MOLDING PREFORM

CROSS REFERENCE TO RELATED APPLICATIONS

This is a Division of application Ser. No. 14/900,700 filed Dec. 22, 2015, which in turn is a national stage entry of PCT/JP2014/064566 filed May 27, 2014, which claims priority to JP 2013-136737 filed Jun. 28, 2013. The disclosure of the prior application[s] is hereby incorporated by reference herein in its entirety.

TECHNICAL FIELD

The disclosure relates to a synthetic resin container with a window made by biaxial stretch blow molding, which has a transparent or semitransparent window section through which residual quantity of contents can be observed from outside. The disclosure also relates to a test tube-shaped preform being a precursor of the container and a method of injection molding the preform.

BACKGROUND

Blow molded containers made of synthetic resin have been conventionally used primarily for containing, for example, beverages, food, detergents, cosmetics, and medicine. They are in many cases given a light-blocking property to protect the contents from ultraviolet rays or the like, or configured such that the contents thereof becomes invisible to improve the appearance and design qualities.

Giving a light-blocking property or making the contents invisible from outside has been achieved for example by making the container itself opaque using a colored resin, by coating the outer surface of the container opaque, or by overcoating the outer surface of the container with an opaque shrink film or a shrink film having an opaque printing thereon.

However, when the contents are made invisible from outside as above, the residual quantity of the contents cannot be observed from outside, causing inconvenience and uneasiness in use. In particular, when refilling the container with contents, the filling state is invisible so that the contents may be poured too much to be spilled out.

To alleviate such a problem, a transparent or semitransparent container with a window section may be used. The window section is formed by partially masking the container and then, after painting, removing the mask, or when a shrink film is used by leaving a part of the film transparent without putting any printing thereon. These permit observation of the residual quantity of the contents from outside.

JP2005153901A (PTL 1) describes a blow molded container made by direct blow molding. The container has a longitudinal strip-shaped window section made of a transparent resin formed in the circumferential wall made of a colored resin. The window section completely interrupts the circumferential wall.

This container is formed by extrusion molding a cylindrical parison 131, which is a precursor, as shown in FIG. 12. The parison 131 is blow molded such that an uncolored transparent resin Rtr is flown, in the direction of extrusion, into a part of a cylindrical flow path of a dies used for the extrusion molding, through which a colored resin Rcol flows; and a circumferential wall composed of the colored resin Rcol is completely interrupted circumferentially by the transparent resin Rtr extruded as a longitudinal strip. A longitudinal strip-shaped, transparent window section can be formed relatively easily in this container.

CITATION LIST

Patent Literature

PTL 1: JP2005153901A

SUMMARY

Technical Problem

As described above, the containers made by direct blow molding can be provided with a longitudinal strip-shaped, transparent window section relatively easily.

On the other hand, the containers such as bottles obtained by biaxial stretch blow molding, or specifically containers obtained by subjecting test tube-shaped preforms made by injection molding to biaxial stretch blow molding, which are made for example of polyethylene terephthalate (hereinafter "PET") resin, would have the following problem and the like if longitudinal strip-shaped, transparent window sections are formed in the same manner as the window section of the containers made by direct blow molding. The problem is that a colored resin may be mixed into a portion of the transparent window section to spoil the appearance of the window section, which may then make a part of the window section opaque.

The test tube-shaped preform is injection molded in the following manner. Within a nozzle provided in an injection molding apparatus, similarly to the above-described molding of the parison performed by direct blow molding, an uncolored transparent resin Rtr is flown, in the direction of extrusion, into a part of a cylindrical flow path where a colored resin Rcol flows, thereby forming a laminated molten resin having a cylindrical shape with a laminated structure such as the one shown in FIG. 13A, where a circumferential wall formed of the colored resin Rcol is completely interrupted circumferentially by the transparent resin Rtr; and the cylindrical laminated molten resin is formed into a columnar shape having the laminated structure shown in FIG. 13B at the tip of the nozzle, thereby being injected and flown into a test tube-shaped cavity 4 through a gate 5 to fill the cavity 4, as shown in FIG. 13C.

In this case, a part of the colored resin Rcol may enters into the inner circumferential surface side of the transparent resin Rtr as shown in FIG. 13C. This may cause a part of the colored resin Rcol to be mixed into the inner circumferential surface side of the window section to thereby cause the above-mentioned problems such as spoiling of the appearance of the window section, which may further make a part of the window section opaque.

The above-described containers with a window made by direct blow molding or by biaxial stretch blow molding are each provided with a longitudinal strip-shaped section formed of a transparent resin that penetrates a circumferential wall formed of a colored resin. The transparent, longitudinal strip-shaped section serves as a longitudinal strip-shaped window section of the container. Most of the inner surface of the circumferential wall is thus formed of the colored resin, causing the contents accommodated by the container to directly contact the colored resin. This may result in a problem of quality change or the like in the contents depending on the type of contents or the type of pigment or filler dispersed for coloring or imparting light-blocking property.

The disclosure herein is intended to solve to the above-described problems, such as spoiling of appearance of the window section and the quality change or the like in the contents, associated with the synthetic resin container with a window made by biaxial stretch blow molding. An object thereof is to provide a container made by biaxial stretch blow molding, which has a longitudinal strip-shaped, transparent window section clearly formed.

Solution to Problem

The disclosure relates to a synthetic resin container with a window made by biaxial stretch blow molding, a test tube-shaped preform being a precursor of the container, and a method of injection molding the preform. For the convenience of illustration, the descriptions will be made in the order of the preform, the container with a window, and the method of injection molding.

The features of the preform will be first described. The preform with those features can be molded by the below-described injection molding method of the disclosure.

The preform disclosed herein is a test tube-shaped preform for biaxial stretch blow molding made by injection molding. The main features of the preform include a transparent base layer; a circumferential wall formed of the transparent base layer; a light-blocking or opaque intermediate layer formed in the base layer in a laminated manner over an area of a predetermined height of the circumferential wall. The intermediate layer is formed in a laminated manner over an area covering an entire circumference of the circumferential wall excluding a non-laminated section, where the intermediate layer is not formed, that extends in a shape of a longitudinal strip along a central axis direction on the circumferential wall of the preform.

The container with a window made by biaxial stretch blow molding described with reference to with FIG. 13 above has a longitudinal strip-shaped section formed of a transparent resin that penetrates a circumferential wall formed of a colored resin. The transparent, longitudinal strip-shaped section serves as a longitudinal strip-shaped window section of the container. On the other hand, the above-described test tube-shaped preform has a circumference wall having a laminated structure obtained by forming an opaque intermediate layer in a transparent base layer in a laminated manner. More specifically, the laminated structure is composed of the base layer, the intermediate layer, and the base layer arranged in this order from outside to inside. A non-laminated section, where the intermediate layer is not formed, that extends in a shape of a longitudinal strip is also provided. This transparent non-laminated section serves as a longitudinal strip-shaped window section of the container made by biaxial stretch blow molding.

The transparent base layer herein also includes a colored, transparent base layer and a semitransparent base layer, in addition to the uncolored, transparent base layer.

According to the above laminate arrangement, a columnar laminated molten resin formed at a tip of a nozzle provided in an injection molding apparatus is injected or flown through a gate into a cavity having a test tube shape, maintaining the laminated structure of "base layer/intermediate layer/base layer", as described in detail later with reference to the molding method of the disclosure. Thus, the above-described problem associated with the injection molding method shown in FIG. 13, that is, a colored resin is mixed into a portion of a transparent window section to spoil the appearance of the window section, can be overcome, thereby allowing formation of a transparent, clear window section.

Another feature of the disclosed preform is that, in the above main features, the intermediate layer is formed in a laminated manner to cover a range of substantially a total height.

In terms of moldability or the like, the intermediate layer may not be formed near an upper end surface of a mouth tube or over a bottom wall of a bottom. To cover such cases, this feature has been defined to recite "a range of substantially a total height".

Still another feature of the disclosed preform is that, in the above main features, the intermediate layer is formed in a laminated manner over an entire area near the bottom that at least includes the bottom wall.

The intermediate layer may be formed in a laminated manner over a range of a total height as above, or may be formed over a range of a height excluding for example the mouth tube, the bottom, or the like. The laminated range of the intermediate layer in the preform can be selected in accordance with the intended use of the container. According to the below-described molding method, the intermediate layer may be formed in a laminated manner over an entire area near the bottom that includes the bottom wall as described above.

The range to be covered by the non-laminated section formed within the range of the height where the intermediate layer is formed in a laminated manner can be also selected, as the laminated range of the intermediate layer in the preform, in accordance with the intended use of the container, such as light-blocking effect and the like.

Next, the features of the container with a window of the disclosure will be described. The container with those features can be made by subjecting the above-described preform to biaxial stretch blow molding.

The container with a window disclosed herein is a synthetic resin container or bottle with a window made by subjecting a test tube-shaped preform being a precursor made by injection molding to biaxial stretch blow molding. The main features of the container include a transparent base layer; a circumferential wall formed of the base layer; and a light-blocking or opaque intermediate layer formed in the base layer in a laminated manner to cover an area of a predetermined height of the circumferential wall, wherein the intermediate layer is formed in a laminated manner over an area covering an entire circumference of the circumferential wall excluding a non-laminated section, where the intermediate layer is not formed, that extends in a shape of a longitudinal strip along a central axis direction of the container on the circumferential wall of the container, and the non-laminated section serves as a window section.

The container with a window having the above features has a longitudinal strip-shaped, transparent window section clearly formed by biaxial stretch blow molding, as previously described with reference to the preform.

The intermediate layer can be formed in a laminated manner over substantially an entire area of the circumferential wall of the container excluding the window section, and a major material resin may be for example a PET resin and an intermediate layer resin may be for example an ethylene vinyl alcohol copolymer (EVOH) resin or an MX nylon resin with high gas barrier performance, which are colored. As such, nearly the entire area of the circumferential wall excluding the window section can be provided with the intermediate layer, which imparts light-blocking property, a window function, and a high gas barrier function to the container.

The above-mentioned resins such as an EVOH resin and an MX nylon resin may reduce their performance when the contents are composed principally of water. However, the use of a PET resin or a polyolefinic resin for the base resin allows the use of this type of resin, which exhibits poor resistance to contents, as the intermediate layer without problems. Thus, an intermediate layer composed of such resins being colored allows the container to exert light-blocking effect and functions such as gas barrier performance.

The intermediate layer is formed in the base layer in a laminated manner to provide a laminated structure of sandwich arrangement. This prevents the contents from directly contacting the intermediate layer in which pigment or filler is dispersed. Therefore, the problems such as quality change or the like in the contents can be also overcome.

Another feature of the disclosed container with a window is that, in the above main features, the intermediate layer is formed in a laminated manner to cover a range of substantially a total height. This allows light-blocking effect to be sufficiently exerted.

This also allows the circumferential wall to be uniformly colored entirely, so that good appearance can be achieved.

Still another feature of the disclosed container with a window is that, in the above main features, the intermediate layer is formed in a laminated manner over an entire area near a bottom that at least includes a bottom wall.

Still another feature of the disclosed container with a window is that, in the above main features, the base layer is made of an uncolored PET resin and the intermediate layer is made of a colored, opaque PET resin.

Next, the main features of the method of injection molding a preform of the disclosure will be described. The method is an injection molding method of the above-described test tube-shaped preform for biaxial stretch blow molding, in which an intermediate layer is formed in a base layer in a laminated manner. The method is performed with a use of an injection molding apparatus including a nozzle, the nozzle comprising:

three cylindrical flow paths for layer formation disposed concentrically about the same axis, the three cylindrical flow paths including an inner flow path and an outer flow path for forming the base layer composed of a major material resin, and a middle flow path for forming the intermediate layer composed of an intermediate layer resin, the middle flow path being disposed between the inner flow path and the outer flow path;

a columnar combined flow path disposed downstream from the three cylindrical flow paths for layer formation, at the columnar combined flow path, the three flow paths being combined;

a shut-off longitudinal rib piece disposed at a downstream end of the middle flow path, the shut-off longitudinal rib piece traversing the middle flow path relative to the circumferential direction and circumferentially interrupting the middle flow path, the method comprising:

supplying the major material resin from the outer flow path and the inner flow path to the combined flow path for a predetermined time period at a predetermined supplying rate;

for a certain period of time within a range of the predetermined time period during which the major material resin is supplied, simultaneously supplying the intermediate layer resin from the middle flow path to the combined flow path at a predetermined supplying rate;

injecting a columnar laminated molten resin into a cavity of a metal mold connected to a tip of the nozzle through a gate to fill the cavity, the columnar laminated molten resin being composed of the major material resin and the intermediate layer resin formed in the major material resin in a laminated manner that are combined into a columnar shape at the combined flow path, and the gate being disposed at a position in the cavity that corresponds to a center of a bottom wall of a bottom of a preform; and forming a non-laminated section, where the intermediate layer is not formed, that extends in a shape of a longitudinal strip along an central axis direction on a circumferential wall of the preform, by causing the shut-off longitudinal rib piece to circumferentially interrupt the intermediate layer resin in the middle flow path.

Another feature of the disclosed method of injection molding the preform includes, in the above main features, configuring the injection molding apparatus to be used such that an opening end of the inner flow path into the combined flow path is shut off or released and further such that an opening degree of the opening end is adjusted, by controlling the position of a tip of a columnar shut-off pin that is slidably inserted into or disposed in a space inward of the inner flow path;

shutting off the opening end, by controlling the position of the tip of the shut-off pin, during the period from when a predetermined time has passed after the supply of the intermediate layer resin is started to at least when the supply of the intermediate layer resin is finished; and forming the intermediate layer in a laminated manner over an entire area near the bottom of the preform that at least includes the bottom wall.

Advantageous Effect

The features of the disclosed products and methods have been described above, and they provide the following advantageous effects.

The disclosed preform has a circumferential wall with a laminated structure obtained by forming an opaque intermediate layer in a transparent base layer in a laminated manner. More specifically, the laminated structure is composed of the base layer, the intermediate layer, and the base layer arranged in this order from outside to inside. A non-laminated section, where the intermediate layer is not formed, that extends in a shape of a longitudinal strip is also provided. This transparent non-laminated section serves as a longitudinal strip-shaped window section of the container made by biaxial stretch blow molding. With these features, a colored resin will not be mixed into a portion of a transparent window section to spoil the appearance of the window section, or a part of the window section will not be made opaque. It becomes thus possible to provide a container made by biaxial stretch blow molding which has a transparent, clear window section.

In the disclosed products, the intermediate layer is formed in the base layer in a laminated layer to provide a laminated structure of sandwich arrangement. This prevents the contents from directly contacting the intermediate layer in which pigment or filler is dispersed. Therefore, the problems such as quality change or the like in the contents can be also overcome.

BRIEF DESCRIPTION OF THE DRAWINGS

In the accompanying drawings:

FIG. 3 is a perspective view illustrating one example of a preform according to the disclosure;

FIG. 9 illustrates an example of injection patterns used in an injection molding method according to the disclosure;

FIGS. 13A, 13B, and 13C schematically illustrate an example of a conventional filling process of a metal mold cavity with a laminated molten resin.

DETAILED DESCRIPTION

The following describes a synthetic resin container with a window made by biaxial stretch blow molding, a preform, and an injection molding method of the disclosure, with reference to examples and the drawings.

Figure 1:
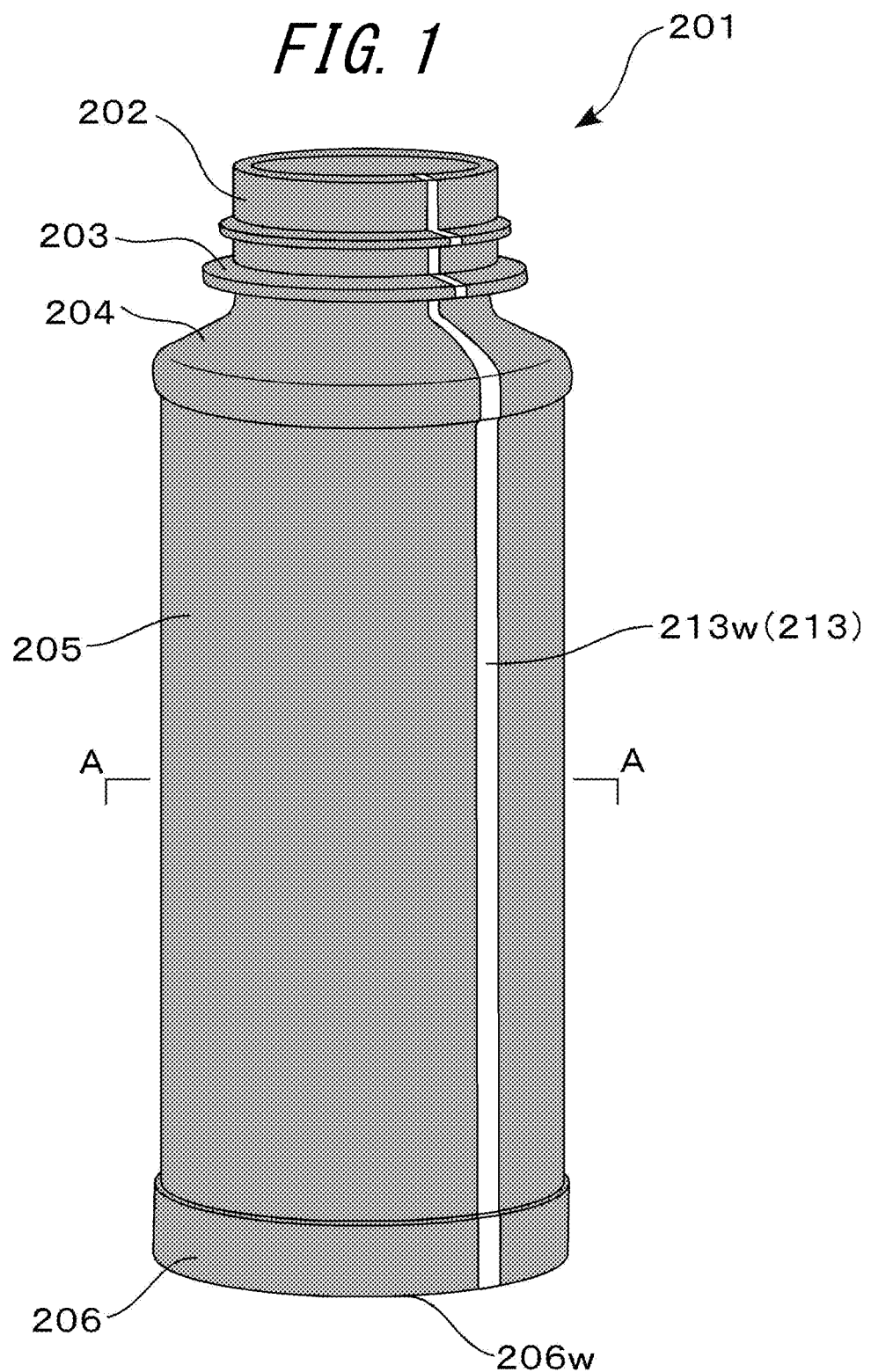
FIG. 1 is a perspective view illustrating one example of a container with a window according to the disclosure.
Figure 2:
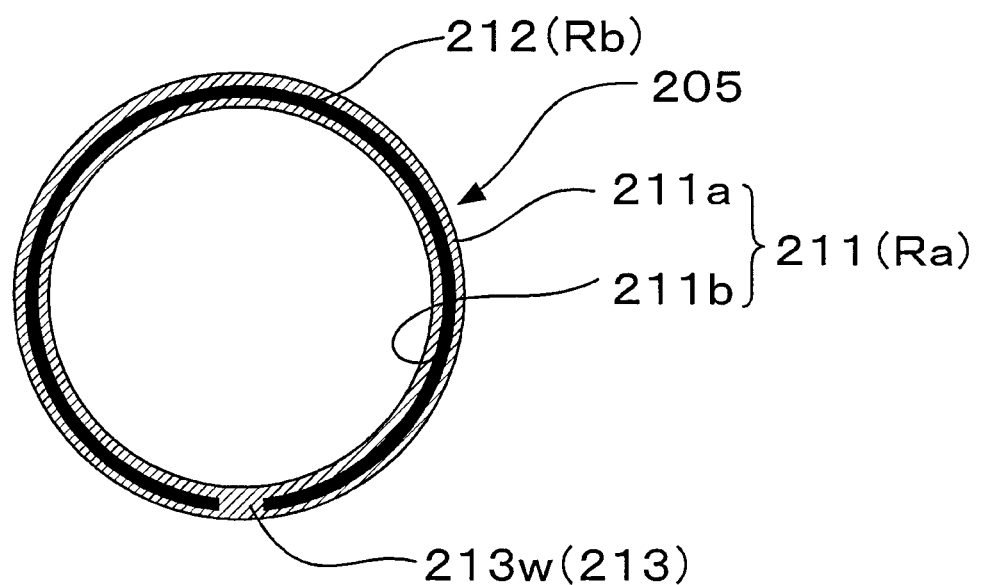
FIG. 2 is a plane cross-sectional view taken along the line A-A of the container of FIG. 1.

FIGS. 1 and 2 illustrate one example of a container with a window of the disclosure, where FIG. 1 is an overall perspective view and FIG. 2 is a plane cross-sectional view taken along the line A-A of FIG. 1.

This container 201 is a bottle of PET resin, which is made by subjecting a test tube-shaped preform 101, which will be described below, to biaxial stretch blow molding. The container 201 includes a mouth tube 202, a tapered-tube shoulder 204, a cylindrical body 205, and a bottom 206. The mouth tube 202 has a circumferential neck ring 203. The body 205 has a diameter of 55 mm and a total height of 190 mm.

The circumferential wall of the container 201 has a laminated structure composed of three layers. Specifically, an intermediate layer 212 is formed in a base layer 211 in a laminated manner to cover a range of substantially a total height, excluding an upper edge of the mouth tube 202 and a bottom wall 206w of the bottom 206. The base layer 211 is made of a major material resin Ra, which is an uncolored PET resin forming the entire circumferential wall, and the intermediate layer 212 is made of an intermediate layer resin Rb which is a white-colored PET resin. In a word, the circumferential wall has a laminated structure composed of a base layer 211a, the intermediate layer 212, and a base layer 211b arranged in this order from the outer surface to the inner surface as shown in FIG. 2.

In FIG. 2, the base layer 211 is shown such that it is separated into the base layer 211a, positioned on the outer surface side, and the base layer 211b, positioned on the inner surface side.

The circumferential wall has, on its side surface, a longitudinal strip-shaped non-laminated section 213, where the longitudinal intermediate layer 212 is not formed, or specifically the circumferential wall consists exclusively of the base layer 211. As shown in the perspective view of FIG. 1, the longitudinal strip-shaped non-laminated section 213 serves as a window section 213w through which the inside of the container 201 can be observed to permit monitoring of the residual quantity of the liquid inside.

The intermediate layer 212 functions as a light-blocking layer.

The plane cross-sectional view of FIG. 2 shows a laminate arrangement composed of the base layer 211 and the intermediate layer 212 formed in the base layer 211. At the boundary between the intermediate layer 212 and the base layer 211 in the non-laminated section 213, the resins Ra and Rb apparently do not mix with each other, allowing the boundary of the window section 213w to exhibit clear and good appearance.

In FIG. 1 and in the other drawings to be described later, the part on the circumference wall of the container 201 or a preform 101 that displays white-colored appearance given by the intermediate layer is painted pale black as necessary.

Figure 4A:
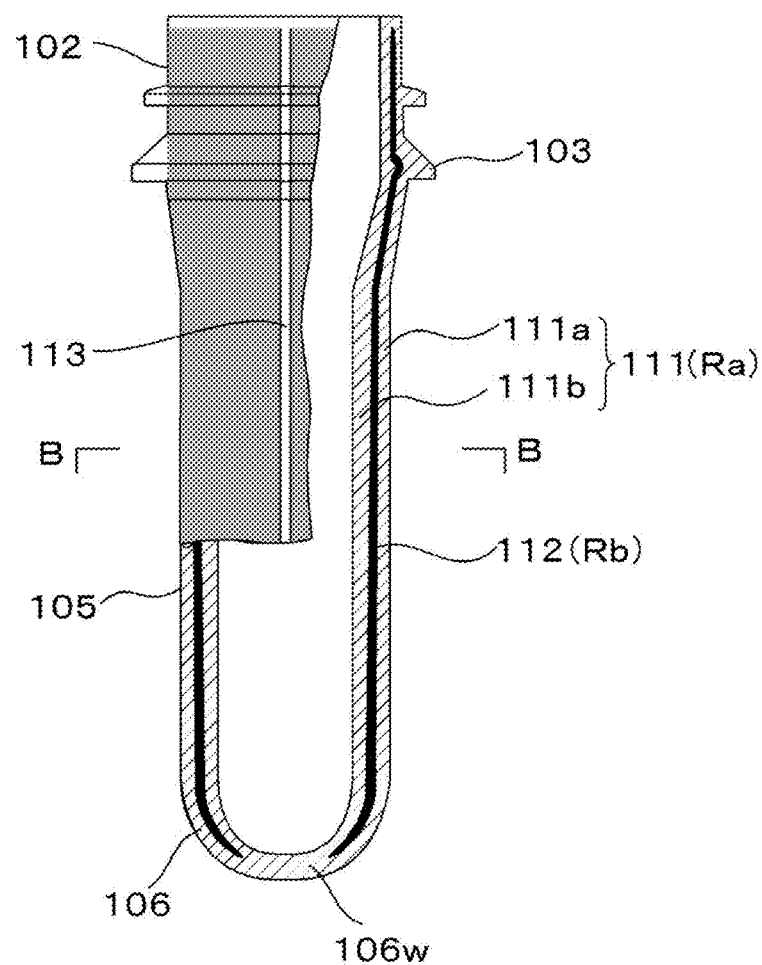
FIG. 4A is a side view of the preform of FIG. 3 with a part thereof being cut longitudinally.
Figure 4B:
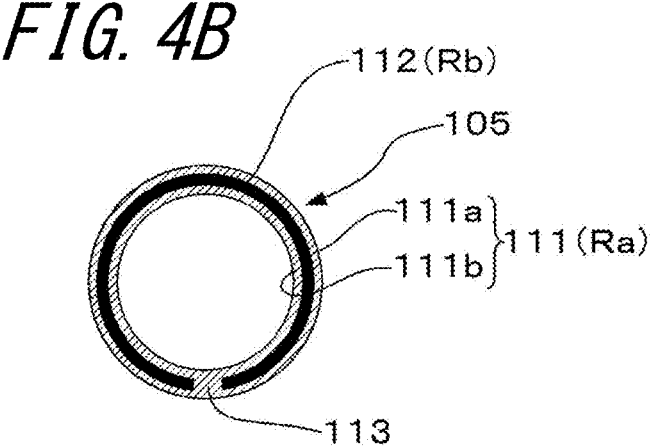
FIG. 4B is a plane cross-sectional view taken along the line B-B of FIG. 4A.
Figure 4C:
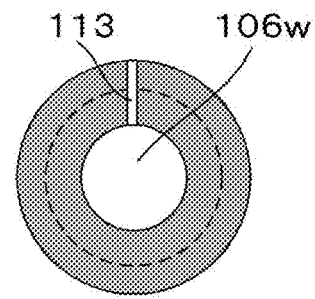
FIG. 4C is a bottom view.

Next, FIGS. 3 and 4 show one example of a preform of the disclosure. This preform 101 is a precursor of the container 201 shown in FIGS. 1 and 2. FIG. 3 is an overall perspective view, FIG. 4A is a side view, with a portion of the preform being cut out longitudinally, FIG. 4B is a plane cross-sectional view taken along the line B-B of FIG. 4A, and FIG. 4C is a bottom view.

The preform 101 has a test tube shape made by injection molding a PET resin. The preform has a mouth tube 102, a cylindrical boy 105, a bottom 106, wherein the mouth tube 102 has a circumferential neck ring 103.

The circumferential wall of the preform 101 has a laminated structure composed of three layers. Specifically, an intermediate layer 112 is formed in a base layer 111 in a laminated manner to cover a range of substantially a total height, excluding an upper edge of the mouth tube 102 and a bottom wall 106w of the bottom 106. The base layer 111 is made of a major material resin Ra, which is an uncolored PET resin forming the entire circumferential wall, and the intermediate layer 112 is made of an intermediate layer resin Rb, which is a white-colored PET resin. In a word, the circumferential wall has a laminated structure composed of a base layer 111a, the intermediate layer 112, and a base layer 111b arranged in this order from the outer surface to the inner circumference surface as shown in FIG. 4B.

The circumferential wall has, on its side surface, a longitudinal strip-shaped non-laminated section 113, where the longitudinal intermediate layer 112 is not formed, or specifically the circumferential wall consists exclusively of the base layer 111.

Further, as shown in FIG. 4C, the bottom wall 106w of the bottom 106 is not provided with the intermediate layer 112, so that the bottom wall 106w is transparent.

The plane cross-sectional view of FIG. 4B shows a laminate arrangement composed of the base layer 111 and the intermediate layer 112 formed in the base layer 111. At the boundary between the intermediate layer 112 and the base layer 111 in the non-laminated section 113, the resins Ra and Rb apparently do not mix with each other, allowing the boundary to be clearly formed.

Figure 5A:
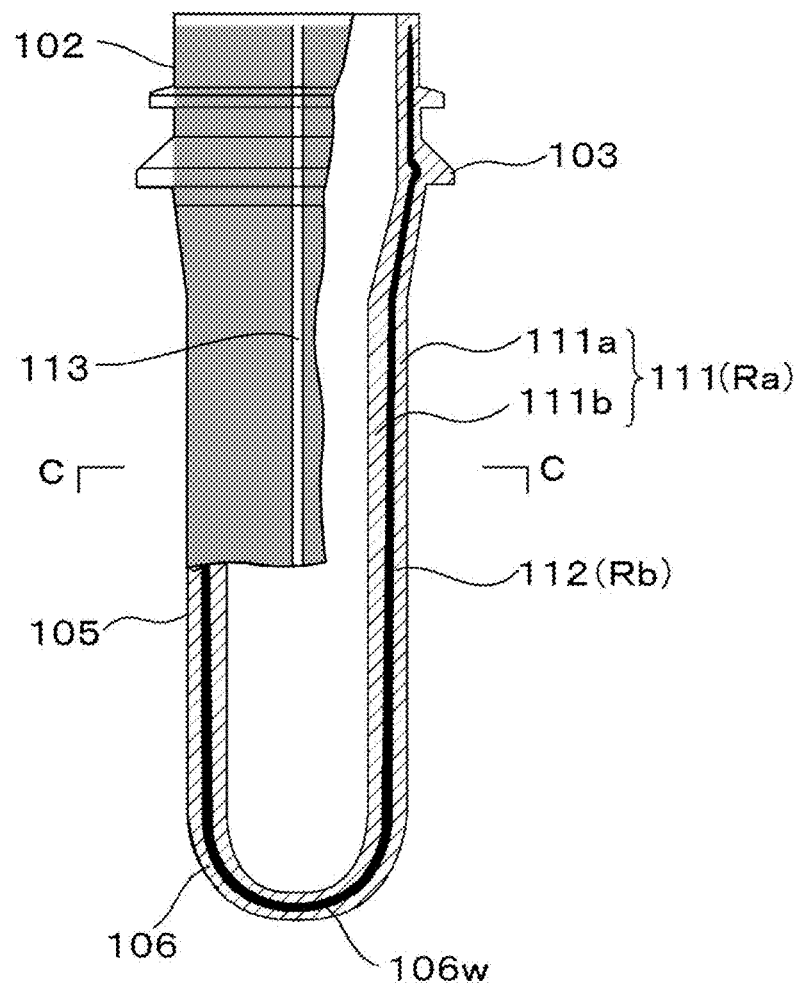
FIG. 5A is a side view of another example of a preform according to the disclosure, with a part thereof being cut longitudinally.
Figure 5B:
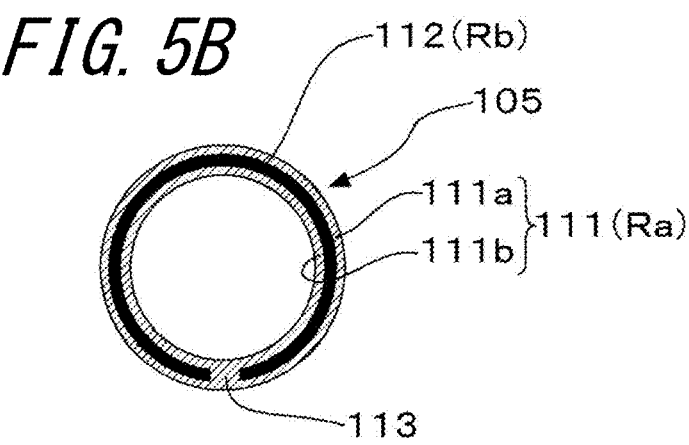
FIG. 5B is a plane cross-sectional view taken along the line C-C of FIG. 5A.
Figure 5C:
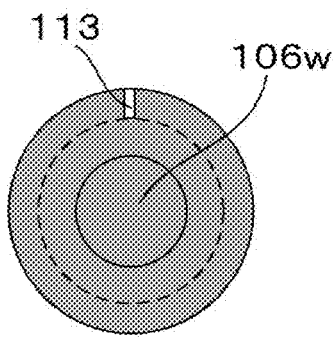
FIG. 5C is a bottom view.

FIG. 5 shows another example of a preform of the disclosure. FIG. 5A is a side view, with a portion of the preform being cut longitudinally, FIG. 5B is a plane cross-sectional view taken along the line C-C of FIG. 5A, and FIG. 5C is a bottom view.

This preform 101 is generally similar to the preform 101 of FIG. 4 except that the intermediate layer 112 is formed in a laminated manner over the entire area of the bottom wall 106w of the bottom 106 and thus the non-laminated area 113 is extended to the lower end of the body 105.

When the preform 101 is formed into the bottle-shaped container 201 by biaxial stretch blow molding, the bottom wall 206w will be also provided with the intermediate layer 212 formed in a laminated manner, thereby allowing the bottom wall 206w to exhibit white, opaque appearance.

Figure 6:
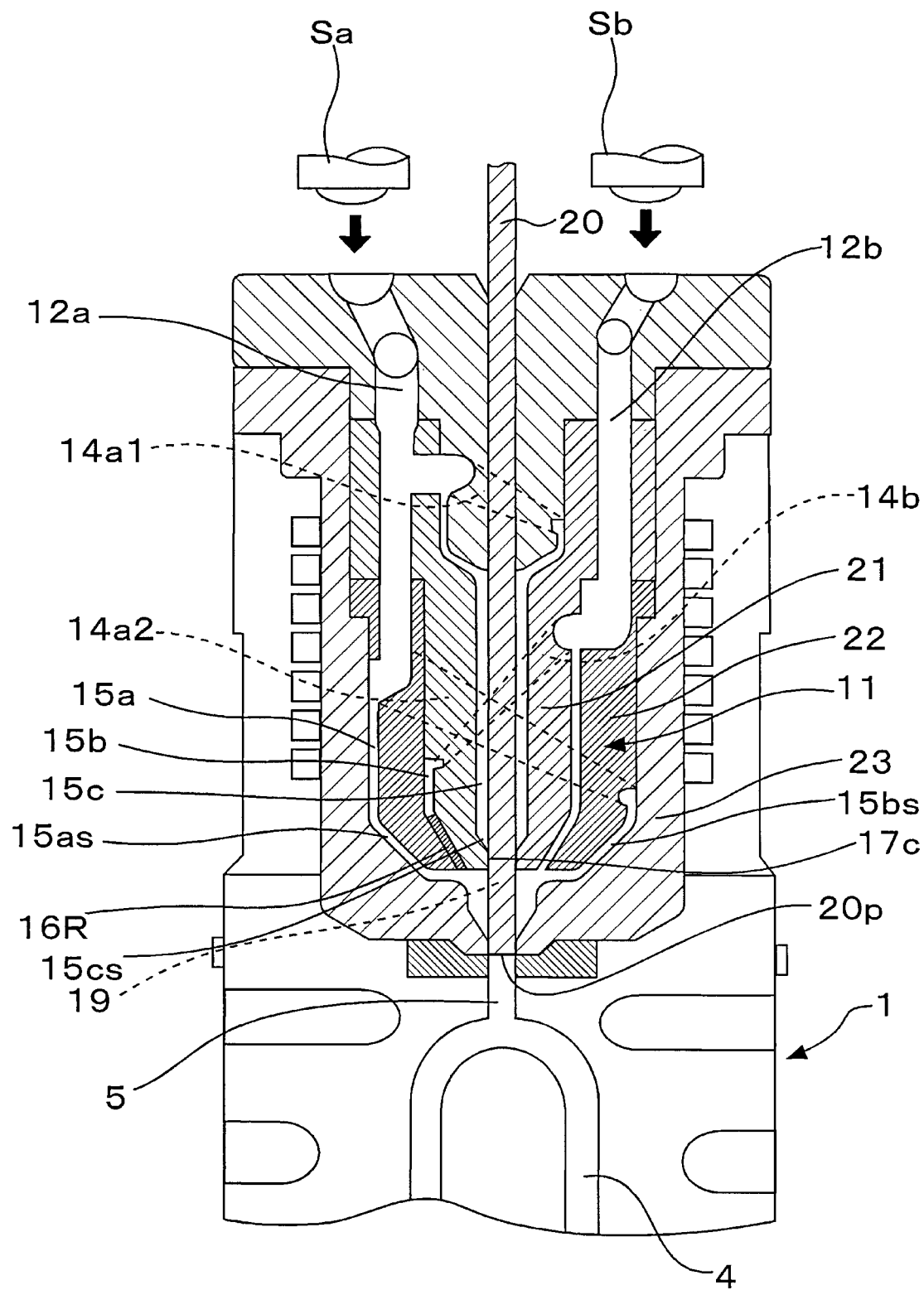
FIG. 6 schematically illustrates an example of an injection molding apparatus used for injection molding according to the disclosure, with essential part thereof being cut longitudinally.
Figure 7:
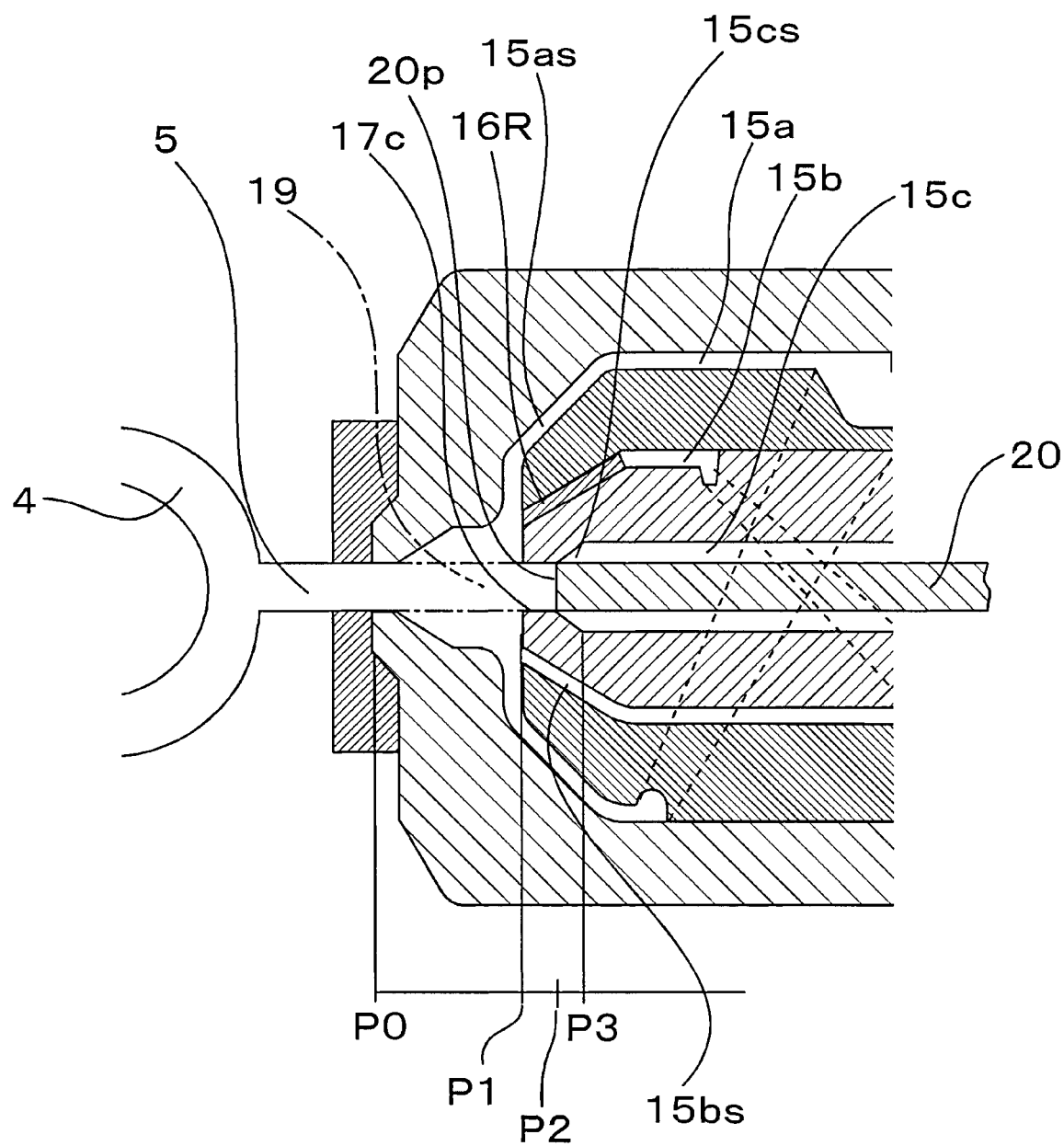
FIG. 7 illustrates movement positions of a shut-off pin in the apparatus of FIG. 6.
Figure 8A:
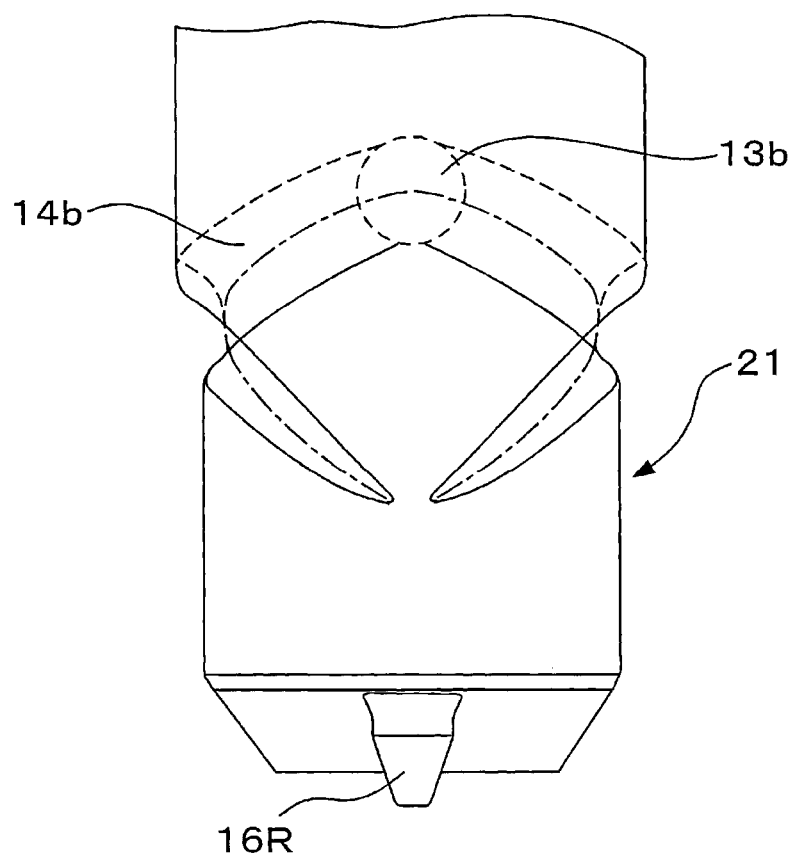
FIG. 8A is a side view of a first mandrel forming a middle flow path of a nozzle shown in FIG. 6.
Figure 8B:
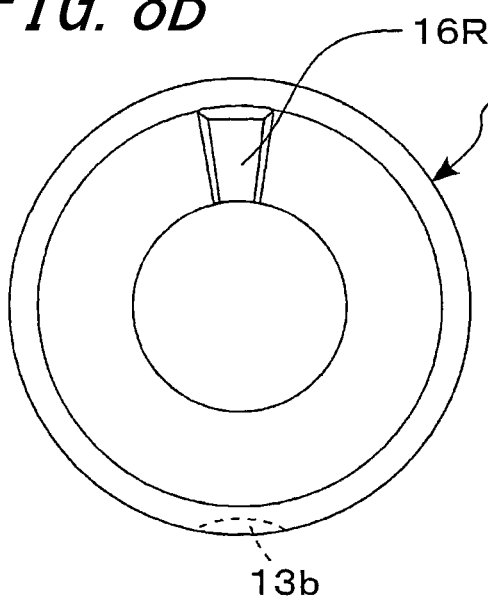
FIG. 8B is a bottom view.
Figure 8C:
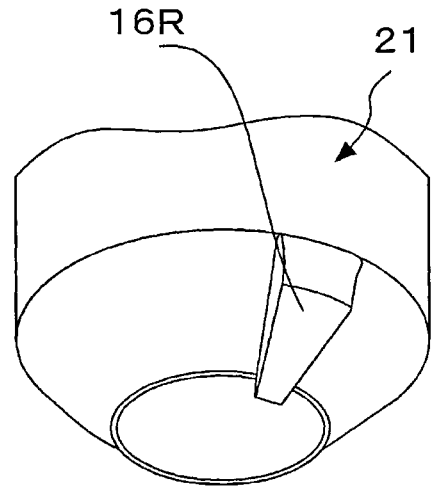
FIG. 8C is a perspective view seen from below obliquely.

Next, FIGS. 6, 7, and 8 schematically show one example of an injection molding apparatus used in the injection molding method of the disclosure. FIG. 6 is a longitudinal cross-sectional view of an area near a nozzle 11, with a metal mold 1 being installed downstream. FIG. 7 is a diagram for illustrating the position of a tip 20p of a shut-off pin 20 in the apparatus of FIG. 6. FIG. 8A is a side view of a first mandrel forming a middle flow path 15b of the nozzle 11, FIG. 8B is a bottom view, and FIG. 8C is a perspective view seen from below obliquely.

The nozzle 11 has a cylindrical first, second, and third mandrels 21, 22, and 23, which are arranged about the same central axis in the above order from the inner side. A columnar shut-off pin 20 is slidably inserted into or disposed in the space inward of the first mandrel 21.

The tip of each mandrel has a tapered tube shape with the diameter being reduced toward downstream.

The third mandrel 23 and the second mandrel 22 define therebetween a cylindrical outer flow path 15a through which the major material resin Ra flows; the second mandrel 22 and the first mandrel 21 define therebetween a cylindrical middle flow path 15b through which a second resin Rb flows; and the first mandrel 21 and the shut-off pin 20 define therebetween a cylindrical inner flow path 15c through which the major material resin Ra flows similarly to the outer flow path 15a.

In the tapered tube portion at the downstream end of the cylindrical flow path of the middle flow path 15b, a shut-off rib piece 16R that traverses the middle flow path 15b is provided such that the middle flow path 15b is circumferentially interrupted.

FIG. 8 shows the shape of the first mandrel 21 serving as the inner circumferential wall of the middle flow path 15b. In the side view shown in FIG. 8A, a groove flow path manifold 14b is disposed in a bilaterally symmetric manner, which distributes a molten resin to a cylindrical flow path from an inlet 13b for the molten intermediate layer resin Rb. The shut-off longitudinal rib piece 16R is disposed at a tapered portion, which is the downstream end, and in the circumferential direction opposite the inlet 13b.

In the nozzle 11 provided with the above flow paths, the major material resin Ra is supplied from a first supplier Sa, such as a screw extruder or an accumulator with a plunger attached to a tip of an extruder, and through a lead-in path 12a and via a manifold 14a1 and a manifold 14a2, the major material resin Ra is guided into the outer flow path 15a and the inner flow path 15c.

The intermediate layer resin Rb is supplied from a second supplier Sb, and through a lead-in path 12b and via the manifold 14b, the intermediate layer resin Rb is guided into the middle flow path 15b.

The major material resin Ra is supplied to a columnar combined flow path 19 from a reduced-diameter flow path 15as disposed at the tip of the outer flow path 15a and a reduced-diameter flow path 15cs disposed at the tip of the inner flow path 15c, and the second resin Rb is supplied to the columnar combined flow path 19 from a reduced-diameter flow path 15bs disposed at the tip of the middle flow path 15b. At the combined flow path 19, the major material resin Ra and the second resin Rb are combined to form a columnar laminated molten resin.

The laminated molten resin is injected into a cavity 4 formed of a cavity metal mold and a core metal mold of the metal mold 1 through a gate 5 to fill the cavity 4. The gate 5 is disposed at the position in the cavity 4 that corresponds to the center of the bottom wall 106w of the bottom 106 of the preform 101.

The intermediate layer resin Rb formed into a cylindrical layer within the middle flow path 15b is circumferentially interrupted by the shut-off longitudinal rib piece 16R disposed at the downstream end. At the combined flow path 19, the intermediate layer resin Rb is incorporated into the major material resin Ra in a laminated manner, with a longitudinal strip-shaped slit being formed by the division. Into this slit part, the major material resin Ra flows. In this way, a longitudinal strip-shaped non-laminated section 113 without the intermediate layer is formed on the circumferential wall of the above-described preform 101.

In the apparatus shown in FIG. 6, the shut-off pin 20 is configured to slide along the inner circumferential surface of the reduced-diameter tip of the first mandrel 21 that defines the inner flow path 15c together with the shut-off pin 20.

The shut-off pin 20 not only demonstrates a common function of shutting off or releasing the tip of the nozzle 11, but also demonstrates a function of adjusting the supply amount of the major material resin Ra to the combined flow path 19 from the inner flow path 15c. The latter function is enabled by controlling the tip 20p such that the position thereof is set to a predetermined position near an end 17c which opens into the combined flow path 19 of the inner flow path 15c to thereby adjust the opening degree of the opening end 17c between a fully open state and a shut-off state.

FIG. 7 is a diagram illustrating the position of the tip 20p of the shut-off pin 20 in the apparatus of FIG. 6.

The position P0 corresponds to the tip of the nozzle 11, the position P3 corresponds to the upstream end of the reduced-diameter flow path 15cs, the position P2 corresponds to the area near the bottom end of the reduced-diameter flow path 15cs, and the position P1 corresponds to the lower end of the inner flow path 15c.

When the tip 20p of the shut-off pin 20 is set at the position P3, the opening degree of the opening end 17c enters into a fully open state; when the tip 20p is at set the position P2, it enters into a half open state, and when the tip 20p is set at the position P1, it enters into a shut-off state.

Accordingly, by adjusting the position of the tip 20p of the shut-off pin 20 between the position P1 to the position P3, the opening degree of the opening end 17c can be adjusted between the fully open state to the shut-off state, which allows for the adjustment of the supply amount of the major material resin Ra to the combined flow path 19 from the inner flow path 15c.

Next, one example of an injection molding method of the disclosure will be described.

FIG. 9 schematically illustrates injection patterns demonstrated for injection molding the preform 101 shown in FIG. 3, 4, or 5, using the injection molding apparatus shown in FIGS. 6 to 8. The horizontal axis indicates time, and the vertical axis indicates supplying rate of the molten resin. The injection pattern of the major material resin Ra is shown by a solid line and that of the intermediate layer resin Rb is shown by a dashed line.

These injection patterns basically corresponds to the injection patterns of what is called simultaneous injection molding, in which the major material resin Ra is supplied from the outer flow path 15a and the inner flow path 15c to the combined flow path 19 for a predetermined time period at a predetermined supplying rate Va, and for a certain period of time within a range of the predetermined time period during which the major material resin Ra is supplied, the intermediate layer resin Rb is simultaneously supplied from the middle flow path 15b to the combined flow path 19 at a predetermined supplying rate.

FIG. 9 also shows control patterns of the position of the tip 20p of two kinds of shut-off pin 20, in combination with the above injection patterns of the molten resins.

The preform 101 shown in FIGS. 3 and 4 is molded by combining the above-described injection patterns of the major material resin Ra and the intermediate layer resin Rb and the control pattern Sp1 indicated by a two-dot chain line. The preform 101 shown in FIG. 5 is molded by combining the above-described injection patterns and the control pattern Sp2 indicated by a single-dot chain line.

The control pattern Sp1 of the shut-off pin 20 indicated in FIG. 9 is a pattern in which the tip 20p is fixed at the position P3 shown in FIG. 7 over the entire time period to allow the opening end 17c of the inner flow path 15c to be in the fully open state. The injection molding process along the time course for this pattern is described below:

(1) Set the position of the tip 20p of the shut-off pin 20 to P3 to fully open the opening end 17c of the inner flow path 15c. Start supplying the major material resin Ra at a time Ta1 at an injection rate of Va from the first supplier Sa, so as to supply the major material resin Ra through the outer flow path 15a and the inner flow path 15c to the combined flow path 19.

(2) Start supplying the intermediate layer resin Rb at a time tb1, which is almost the same timing as the time ta1, at a supplying rate of Vb from the second supplier Sb, so as to supply the intermediate layer resin Rb through the middle flow path 15b to the combined flow path 19. Then flow the intermediate layer resin Rb into the major material resin Ra supplied from the outer flow path 15a and the inner flow path 15c.

(3) Stop supplying the intermediate layer resin Rb from the second supplier Sb at a time tb2.

(4) Reduce the metal mold pressure to a predetermined pressure at a time ta2 (which results in a decrease in the supplying rate Va from the first supplier Sa) and keep the predetermined pressure until a time ta3.

Figure 10A:
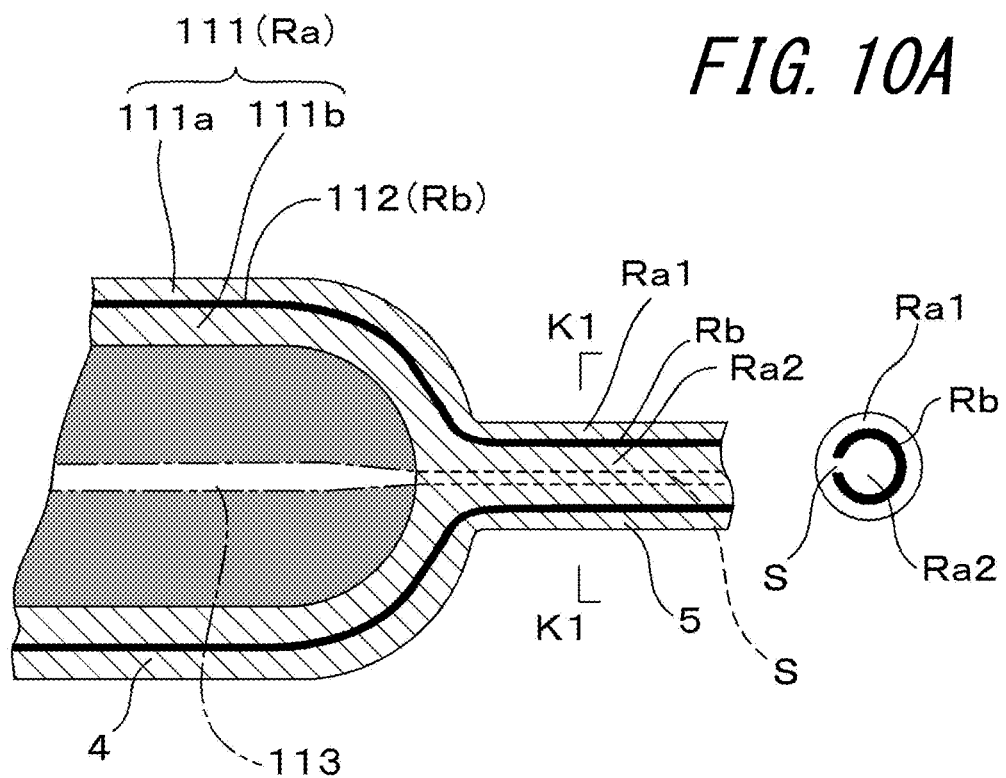
FIGS. 10A and 10B schematically illustrate a filling process of a metal mold cavity with a molten resin, demonstrated in accordance with one of the injection patterns shown in FIG. 9.
Figure 10B:
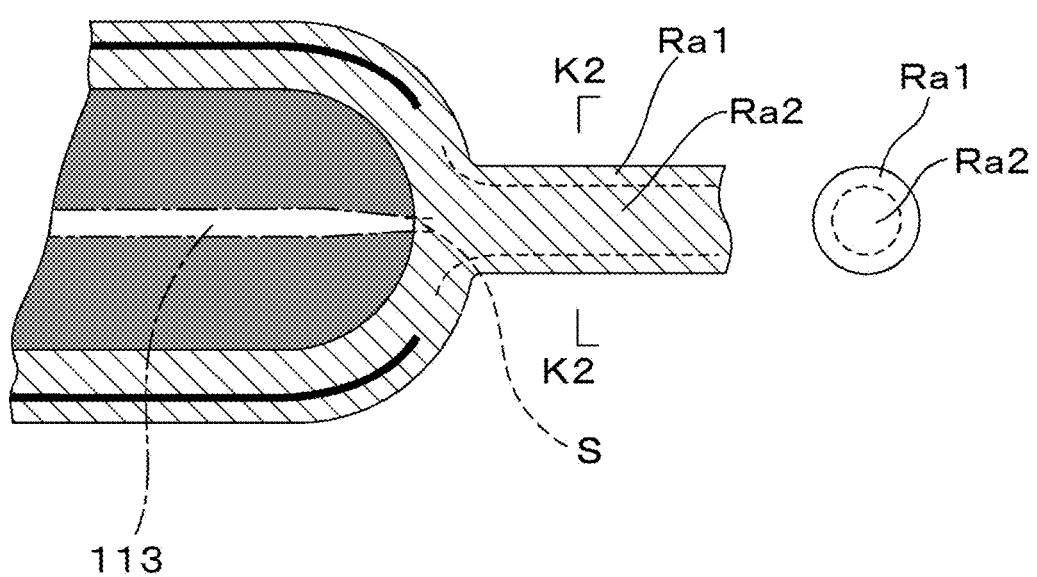

FIG. 10 schematically illustrates a filling process of the cavity 4 of the metal mold 1 with the major material resin Ra and the intermediate layer resin Rb in the above-described process. FIG. 10A shows a state observed between the time tb1 to the time tb2 in FIG. 9, and FIG. 10B shows a state observed at the time Ta3.

FIGS. 10A and 10B each have on the right side a cross-sectional view of the columnar laminated molten resin at the gate 5, taken along the line K1-K1 and the line K2-K2, respectively.

Here, the major material resin Ra is separately shown by denoting the major material resin supplied from the outer flow path 15a as "Ra1", and the major material resin supplied from the inner flow path 15c as "Ra2".

For reference, in the area corresponding to the cavity 4, the position where the longitudinal strip-shaped non-laminated section 113 is formed is shown by a single-dot chain line, and the area where the intermediate layer 112 is formed in a laminated manner is painted pale black.

In the state shown in FIG. 10A, as shown in the cross-sectional view on the right side, the flow path of the intermediate layer resin Rb is interrupted, at the gate 5, by the shut-off longitudinal rib piece 16R provided in the middle flow path 15b. This causes a slit S to be formed and the intermediate layer resin Rb to indicate a C-letter shape in a laminated manner between the major material resins Ra1 and Ra2.

A laminate arrangement shown in FIG. 10B is eventually obtained, providing the preform 101 that has the longitudinal strip-shaped non-laminated section 113 formed by the slit S as shown in FIG. 4, where the bottom wall 106w of the bottom 106 does not have the intermediate layer 112 therein.

Next, the control pattern Sp2 of the shut-off pin 20 shown in FIG. 9 is a pattern where the tip 20p is moved from the position P3 to the position P1 during the period between the time ts1 and the time ts2 to shut-off the opening end 17c for that period.

FIG. 11 schematically illustrates a filling process of the cavity 4 of the metal mold 1 with the major material resin Ra and the intermediate layer resin Rb in the injection molding process demonstrated based on the control pattern Sp2.

Figure 11A:
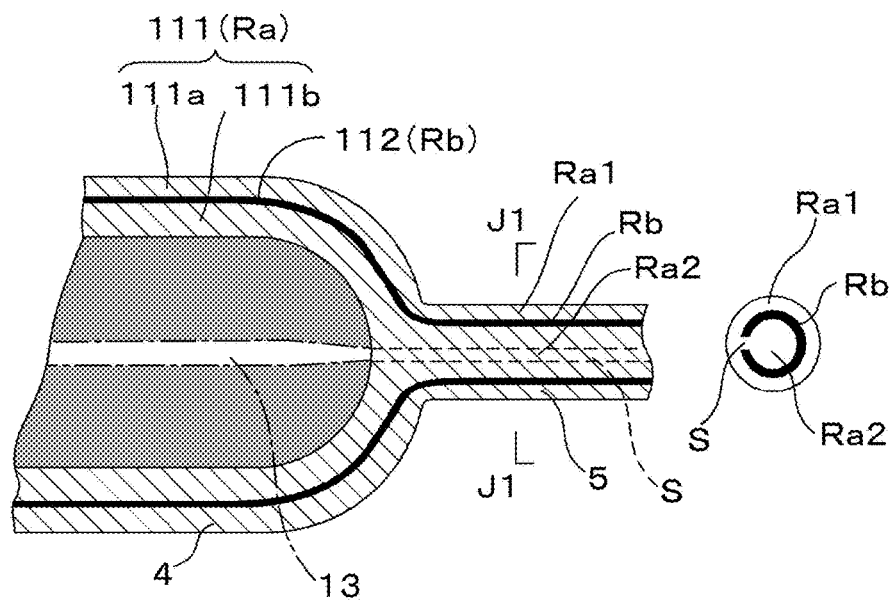
FIGS. 11A, 11B, and 11C schematically illustrate a filling process of a metal mold cavity with a molten resin, demonstrated in accordance with another injection pattern shown in FIG. 9.
Figure 11B:
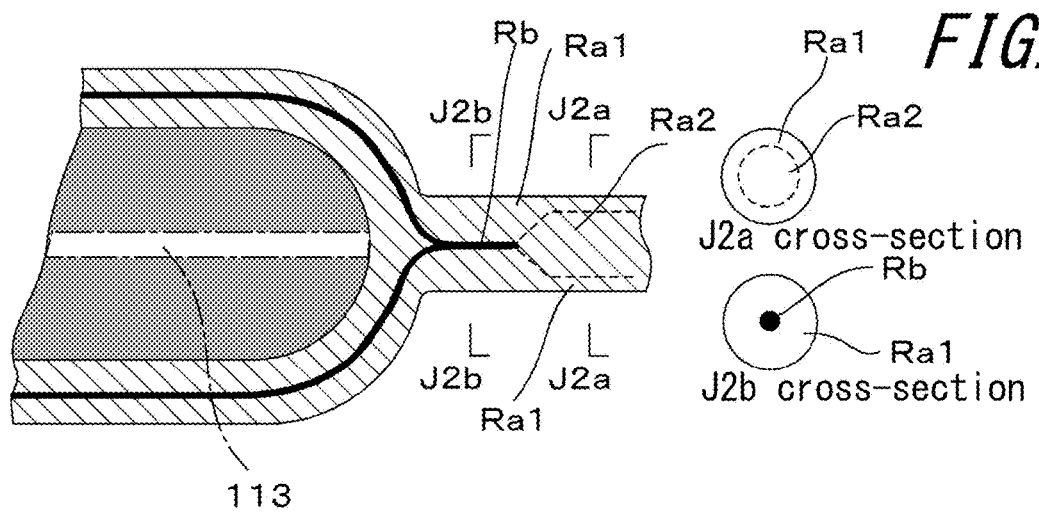
Figure 11C:
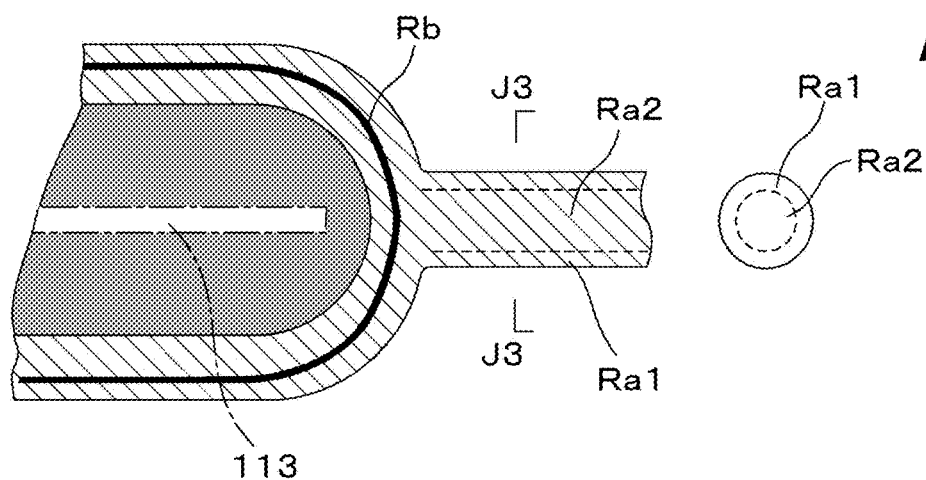
Figure 12A:
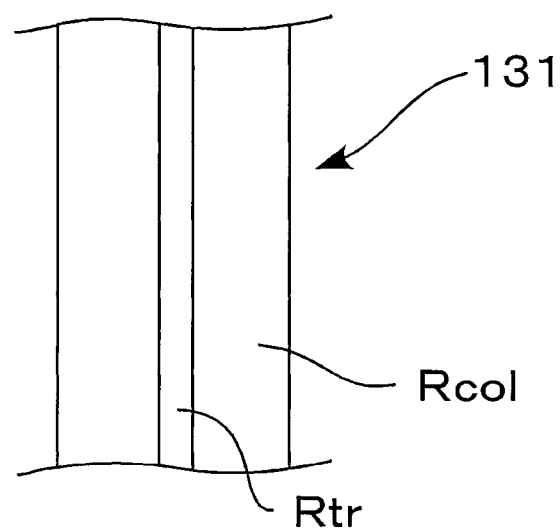
FIGS. 12A and 12B schematically illustrate an extrusion process of a parison performed in direct blow molding.
Figure 12B:
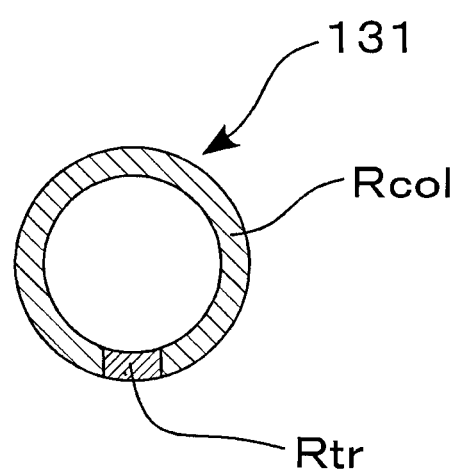

FIG. 11A shows a state observed between the time tb1 to the time ts1 in FIG. 9, FIG. 11B shows a state observed between the time ts2 to the time ta2, and the FIG. 11C shows a state observed at the time ta3.

FIGS. 11A and 11C each have on the right side a cross-sectional view of the columnar laminated molten resin at the gate 5, taken along the line J1-J1 and the line J3-J3, respectively, and FIG. 11B has on the right side cross-sectional views taken along the lines J2a-J2a and J2b-J2b.

In the state shown in FIG. 11A, which is similar to the state of FIG. 10A, the flow path of the intermediate layer resin Rb is interrupted, at the gate 5, by the shut-off longitudinal rib piece 16R provided in the middle flow path 15b, as shown in the cross-sectional view on the right side. This causes a slit S to be formed and the intermediate layer resin Rb to indicate a C-letter shape in a laminated manner between the major material resin layers Ra1 and Ra2.

Further, during the period between the time ts1 to the time ts2, the position of the tip 20p of the shut-off pin 20 is set to P1 to shut off the supply of the major material resin Ra2 from the inner flow path 15c. Thus, in the state of FIG. 11B, the intermediate layer resin Rb, which has indicated the C-letter shape in FIG. 11A, collects about the center of the gate 5 as shown in the J2b-J2b cross section. The slit S accordingly disappears and the intermediate layer resin Rb is formed in a laminated manner in the form of a thin columnar tail.

Subsequently, at the time ts2, the position of the tip 20p is returned to P3 to resume supply of the major material resin Ra2 from the inner flow path 15c. Then, while the predetermined pressure is kept from the time ta2 to the time ta3, the major material resin Ra is flown and subjected to pressure toward the cavity 4 from the gate 5. In this way, the intermediate layer 112 made of the intermediate layer resin Rb takes the laminate arrangement as shown in FIG. 11C.

Therefore, the preform 101 is provided with the longitudinal strip-shaped non-laminated section 113 formed by the slit S as shown in FIG. 5, which also allows the bottom wall 106w of the bottom 106 to be provided with the intermediate layer 112 formed in a laminated manner.

Embodiments of the synthetic resin container with a window, the preform, and the injection molding apparatus of the preform have been described with reference to the examples. However, the disclosed products and method are not limited to the above examples.

For example, the container in the above example has been described as a cylindrical bottle made of a PET resin, yet any other synthetic resin that can be subjected to biaxial stretch blow molding, such as polypropylene (PP) resin, can be used. The shape of the container can also be any shape such as rectangular and the like.

When a PET resin is used for both of the major material resin and the intermediate layer resin, the molecular weight or the like of the resins can be varied based on the flow behaviors of the resins.

The same type of resin is not necessarily used for major material resin and the intermediate layer resin. For example, the major material resin may be a PET resin and the intermediate layer resin may be an EVOH resin or an MX nylon resin with high gas barrier performance, which are colored. As such, nearly the entire area of the circumferential wall excluding the window section can be provided with the intermediate layer formed in a laminated manner, which imparts This allows the container to exhibit both a window function and a high gas barrier function.

Other than providing the window section 213w over the range substantially the total height as in the container 201 of FIG. 1, considering the light-blocking effect or the like, the window section 213w may be formed over an extremely limited range of the body 205 by for example adjusting the time period during which the intermediate layer resin Rb is supplied based on the injection pattern shown in FIG. 9. The range of providing the window section 213w can be appropriately selected in accordance with the intended use of the container.

Further, the base layer 211 may be a colored transparent layer or a semitransparent layer.

INDUSTRIAL APPLICABILITY

The disclosed synthetic resin container with a window has a longitudinal strip-shaped, transparent window section clearly formed by biaxial stretch blow molding. The container is expected to be widely used and developed in the field of light-blocking container or the like.

REFERENCE SIGNS LIST

1 Metal mold
4 Cavity
5 Gate
11 Nozzle
12a, 12b Lead-in path
13b Inlet
14a1, 14a2, 14b Manifold
15a Outer flow path
15b Middle flow path
15c Inner flow path
15as, 15bs, 15cs Reduced-diameter flow path
16R Shut-off longitudinal rib piece
17c Opening end
19 Combined flow path
20 shut-off pin
20p Tip
21 First mandrel
22 Second mandrel
23 Third mandrel
P0, P1, P2, P3 Position (of the tip of the shut-off pin)
Ra Major material resin
Rb Intermediate layer resin
Sa First supplier
Sb Second supplier
101 Preform
102 Mouth tube
103 Neck ring
105 Body
106 Bottom
106w Bottom wall
111, 111a, 111b Base layer
112 Intermediate layer
113 Non-laminated section
201 Container
202 Mouth tube
203 Neck ring
204 Shoulder
205 Body
206 Bottom
206w Bottom wall
211, 211a, 211b Base layer
212 Intermediate layer
213 Non-laminated section
213w Window section
131 Parison
Rcol Colored resin
Rtr Transparent resin

The invention claimed is:

1. A method of injection molding a test tube-shaped preform for biaxial stretch blow molding,
the preform comprising:
a transparent base layer;
a circumferential wall formed of the transparent base layer; and
a light-blocking or opaque intermediate layer formed in the base layer in a laminated manner over an area of a predetermined height of the circumferential wall,
wherein the intermediate layer is formed in a laminated manner over an area covering an entire circumference of the circumferential wall excluding a non-laminated section, where the intermediate layer is not formed, that extends in a shape of a longitudinal strip along a central axis direction on the circumferential wall of the preform
the method being performed with an injection molding apparatus including a nozzle, the nozzle comprising:
three cylindrical flow paths for layer formation disposed concentrically about the same axis, the three cylindrical flow paths including an inner flow path and an outer flow path for forming the base layer composed of a major material resin, and a middle flow path for forming the intermediate layer composed of an intermediate layer resin, the middle flow path being disposed between the inner flow path and the outer flow path;

a columnar combined flow path disposed downstream from the three cylindrical flow paths for layer formation, at the columnar combined flow path the three flow paths being combined; and a single shut-off longitudinal rib piece disposed at a downstream end of the middle flow path only in the opposite side of an inlet in the circumferential direction, the inlet supplying the middle flow path with the intermediate layer resin, the shut-off longitudinal rib piece traversing the middle flow path relative to the circumferential direction and circumferentially interrupting the middle flow path, wherein the shut-off longitudinal rib piece is the only rib piece traversing the middle flow path relative to the circumferential direction and circumferentially interrupting the middle flow path, the method comprising:

supplying the major material resin from the outer flow path and the inner flow path to the combined flow path for a predetermined time period at a predetermined supplying rate;

for a certain period of time within a range of the predetermined time period during which the major material resin is supplied, simultaneously supplying the intermediate layer resin from the middle flow path to the combined flow path at a predetermined supplying rate;

after supplying the intermediate layer resin is finished, decreasing the supplying rate of the major material resin;

injecting a columnar laminated molten resin into a cavity of a metal mold connected to a tip of the nozzle through a gate to fill the cavity, the columnar laminated molten resin being composed of the major material resin and the intermediate layer resin formed in the major material resin in a laminated manner that are combined into a columnar shape at the combined flow path and the gate being disposed at a position in the cavity that corresponds to a center of a bottom wall of a bottom of the preform; and forming a non-laminated section, where the intermediate layer is not formed, that extends in a shape of a longitudinal strip along a central axis direction of the preform on a circumferential wall of the preform, by causing the shut-off longitudinal rib piece to circumferentially interrupt the intermediate layer resin in the middle flow path.

2. The method of injection molding according to claim 1, further comprising:

configuring the injection molding apparatus to be used such that an opening end of the inner flow path into the combined flow path is shut off or released and further such that an opening degree of the opening end is adjusted, by controlling a position of a tip of a columnar shut-off pin that is slidably inserted into or disposed in a space inward of the inner flow path, shutting off the opening end, by controlling the position of the tip of the shut-off pin, during the period from when a predetermined time has passed after the supply of the intermediate layer resin is started to at least when the supply of the intermediate layer resin is finished; and forming the intermediate layer in a laminated manner over an entire area near the bottom of the preform that at least includes the bottom wall.

* * * * *